3,060,087
ANTHELMINTIC COMPOSITIONS AND
METHOD OF USE
Philip Arthur Kingsbury, Berkhamsted, and Roy Vivian
Foster, Tring, England, assignors to Cooper, McDougall & Robertson Limited, Berkhamsted, England, a British company
No Drawing. Filed Nov. 7, 1960, Ser. No. 67,494
Claims priority, application Great Britain Nov. 13, 1959
8 Claims. (Cl. 167—53)

The present invention relates to compositions containing phenothiazine and one or more esters, and to the manufacture thereof.

It has been found that a composition containing phenothiazine and a relatively small proportion of an ester of Formula I has a greater than additive effect against infestations of Trichostrongylus spp., in particular *T. colubriformis* and *T. virtrinus*, and *Strongyloides papillosus* in sheep.

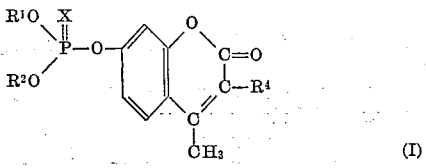

In formula I:
$R^1$ and $R^2$ are the same or different and each is an alkyl group such as a methyl, ethyl or isopropyl group;
X is an oxygen or sulphur atom; and
$R^4$ is a hydrogen or halogen atom.

The "relatively small proportion" of the ester of Formula I in a dose is preferably not greater than the minimum toxic dose level to the host; that is, between 7.0 mg. and 25.0 mg. for sheep, depending on the particular ester and the mode and frequency of administration. The phrase "greater than additive effect" is to be understood as meaning that the effect of the simultaneous administration to an animal of the active components of the said composition at a specified dose level is greater than the sum of the effects of each of the active components at the respective specified dose levels when administered separately to separate animals; and therefore the therapeutic index of the composition is greater than that of each of the active components.

Preferably the composition contains by weight 100 parts of phenothiazine and 0.10 to 10.0 parts of one or more esters of Formula I, and in particular 0.25 to 3.0 parts of one or more esters of Formula I. The preferred esters of Formula I are those in which $R^1$ and $R^2$ are both ethyl groups, especially 3-chloro-4-methyl-7-oxycoumarin-O,O-diethylphosphoric and -thiophosphoric acid esters, and 4-methyl-7-oxycoumarin-O,O-diethylphosphoric acid ester.

The effective dose range of the composition to be administered to the host depends on a number of variable factors, for example the particular ester of Formula I, the parasite to be controlled, the maturity and health of the host, and the mode and frequency of administration of the composition. The amount of phenothiazine in a dose of the composition is preferably not greater than 800 mg./kg. for administration to sheep and 400 mg./kg. to cattle, and not less than 50 mg./kg. for administration to sheep and cattle. The amount of an ester of Formula I in a dose of the composition is preferably not greater than 5.0 mg./kg. for administration to sheep and 10.0 mg./kg. to cattle, and not less than 0.5 mg./kg. for administration to sheep and to cattle. The preferred dose of the composition contains 100 to 400 mg./kg. of phenothiazine and 1.0 to 3.0 mg./kg. of an ester of Formula I.

The composition is preferably administered orally in any acceptable preparation. Fine powders or granules may contain diluents and dispersing and surface active agents, and may be presented in a draft or drench in water or in a syrup; in capsules or cachets in the dry state or in a non-aqueous suspension, when a suspending agent may be included; in tablets, when binders and lubricants may be included; in a suspension in water or a syrup or an oil, or in a water/oil emulsion, when flavouring, preserving, suspending, thickening and emulsifying agents may be included; or in the food of the host of the nematode. The granules or the tablets may be coated. The preferred preparations for administration are fine dispersible powders, tablets and emulsions.

According to the present invention in several aspects, there are provided the compositions containing phenothiazine and a relatively small proportion of one or more esters of Formula I, and animal feeding stuffs containing the composition, and the process for the treatment of nematode infestations which comprises administering to the host of the nematode infested locus the composition.

The composition or the preparations containing the composition and an acceptable carrier therefor may be manufactured by any method comprising respectively the mixing together of the active components of the composition, and the mixing together of the active components of the composition and an acceptable carrier therefor.

The invention will now be described with reference to the following examples.

*Example 1*

| | Percent |
|---|---|
| Phenothiazine | 96.5 |
| 3 - chloro - 4 - methyl - 7 - oxycoumarin - O,O - diethylphosphoric acid ester | 0.5 |
| A wetting and dispersing agent, such as a sodium salt of an alkylarylsulphonic acid | 3.0 |

A fine dispersible powder was prepared by grinding the phenothiazine, mixing some of the phenothiazine with the 3-chloro-4-methyl-7-oxycoumarin-O,O-diethylphosphoric acid ester and the wetting, dispersing agent, adding the rest of the phenothiazine to the mixture, and intimately mixing the resultant mixture.

*Example 2*

| | Percent |
|---|---|
| Phenothiazine | 92.1 |
| 3 - chloro - 4 - methyl - 7 - oxycoumarin - O,O - diethylphosphoric acid ester | 0.5 |
| A binding agent, such as starch | 4.6 |
| A dispersing agent, such as sodium bicarbonate | 1.9 |
| A lubricating agent, such as talc | 0.9 |

Tablets of the above composition and weighing 5.0 g. were prepared by intimately mixing the ingredients together, granulating the mixture, and compressing the granules.

*Example 3*

3-chloro-4-methyl-7-oxycoumarin-O,O-diethylphosphoric acid ester (1 part) was mixed with a diatomaceous earth known as "Celite 209" (4 parts) in a ball mill. The mixture (3.33 parts) was mixed with a dispersible powder of phenothiazine (96.67 parts; 92% technical phenothiazine and 8% of a wetting and dispersing agent containing a sodium salt of an alkylarylsulphonic acid). The resulting powder dispersed in water and was suitable for administering a dose of 200 mg./kg. technical phenothiazine together with 1.5 mg./kg. of the ester.

Example 4

3-chloro-4-methyl-7-oxycoumarin-O,O-diethylthiophosphoric acid ester (1 part) was mixed in a mill with a dispersible powder of phenothiazine (5 parts; 92% technical phenothiazine and 8% of a wetting and dispersing agent containing a sodium salt of an alkylarylsulphonic acid). More of the dispersible powder of phenothiazine (104 parts) was added to the mixture. The resulting powder dispersed in water and was suitable for administering a dose of 200 mg./kg. technical phenothiazine together with 2 mg./kg. of the ester.

Example 5

Preparations similar to those described in Examples 1, 2 and 3 were manufactured using 3-chloro-4-methyl-7-oxycoumarin-O,O-diethylthiophosphoric or 4-methyl-7-oxycoumarin-O,O-diethylphosphoric acid ester instead of the 3-chloro-4-methyl-7-oxycoumarin-O,O-diethylphosphoric acid ester.

Example 6

Compositions were made by mixing the following components, the amount of each component being specified respectively as the amount in mg./kg. administered to the host.

(a) Phenothiazine and 3-chloro-4-methyl-7-oxycoumarin-O,O-diethylthiophosphoric acid ester:

(i) 1000 and 2.5      (vi) 100 and 2.5
(ii) 500 and 2.5      (vii) 200 and 2.0
(iii) 400 and 2.5     (viii) 500 and 1.0
(iv) 300 and 2.5      (ix) 500 and 0.5
(v) 200 and 2.5

(b) Phenothiazine and 3-chloro-4-methyl-7-oxycoumarin-O,O-diethylphosphoric acid ester:

(i) 500 and 2.0       (vi) 200 and 1.5
(ii) 400 and 2.0      (vii) 500 and 1.0
(iii) 200 and 2.0     (viii) 200 and 1.0
(iv) 100 and 2.0      (ix) 500 and 0.5
(v) 50 and 2.0        (x) 100 and 0.5

(c) Phenothiazine and 4-methyl-7-oxycoumarin-O,O-diethylphosphoric acid ester:

(i) 500 and 3.0       (iii) 100 and 2.0
(ii) 200 and 2.0      (iv) 200 and 1.0

(d) Phenothiazine and 3-bromo-4-methyl-7-oxycoumarin-O,O-diethylthiophosphoric acid ester:

500 and 5.0

(e) Phenothiazine and 3-chloro-4-methyl-7-oxycoumarin-O,O-dimethylthiophosphoric acid ester:

500 and 20.0

(f) Phenothiazine and 3-chloro-4-methyl-7-oxycoumarin-O,O-di-isopropylthiophosphoric acid ester:

500 and 25.0

(g) Phenothiazine and 4-methyl-7-oxycoumarin-O,O-diethylthiophosphoric acid ester:

500 and 3.0

Example 7

(a) 4-methyl-7-oxycoumarin-O,O-diethylphosphoric acid ester was prepared by reacting 4-methyl-7-hydroxycoumarin with O,O-diethylphosphite and had a refractive index of 1.5458.

(b) 3-chloro-4-methyl-7-oxycoumarin-O,O-di-isopropylthiophosphoric acid ester was prepared by reacting 3-chloro-4-methyl-7-hydroxycoumarin and di-isopropyl thiophosphoryl chloride and had a melting point of 120° C.

We claim:

1. A composition containing phenothiazine and a relatively small proportion of an ester of the formula:

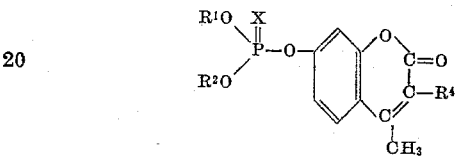

wherein $R^1$ and $R^2$ are each a lower alkyl group, X is selected from the class consisting of oxygen and sulphur atoms, and $R^4$ is selected from the class consisting of hydrogen and halogen atoms.

2. A composition as claimed in claim 1 wherein there are by weight 100 parts of phenothiazine and 0.1 to 10.0 parts of defined ester.

3. A composition as claimed in claim 1 wherein the ester has both $R^1$ and $R^2$ as ethyl groups.

4. A composition as claimed in claim 1 wherein the ester is 3-chloro-4-methyl-7-oxycoumarin-O,O-diethylphosphoric acid.

5. A composition as claimed in claim 1 wherein the ester is 3-chloro-4-methyl-7-oxycoumarin-O,O-diethylthiophosphoric acid.

6. A composition as claimed in claim 1 wherein the ester is 4-methyl-7-oxycoumarin-O,O-diethylphosphoric acid.

7. An animal feeding stuff containing a composition as claimed in claim 1.

8. A process for the treatment of nematode infestations which comprises the administration to the host of the nematode infested locus a composition as claimed in claim 1.

References Cited in the file of this patent

UNITED STATES PATENTS 2,956,923   Kent _____ Oct. 13, 1960

OTHER REFERENCES

Herlich: Chem. Abst., vol. 52, 1958, page 14978b.
Sollmann: A Manual of Pharmacology, 8th ed., 1957, page 221, Saunders Co., Phila., Pa.